Inventor
Walter W. Wood

Patented Apr. 15, 1941

2,238,202

UNITED STATES PATENT OFFICE 2,238,202

SPRING SUSPENSION

Walter W. Wood, Canton, Ohio

Application February 24, 1940, Serial No. 320,673

8 Claims. (Cl. 267—16)

The invention relates to springs for suspending automobiles and similar vehicles from the wheel axle, and has for its object to provide a spring suspension which will produce a saving in power required to surmount obstacles, a saving in wear on tires, a reduction in the destructive effect of road shock on the vehicle, an increase in the comfort of riding, and an increase in the ease of control of the vehicle, as well as in the safety when driven at higher speeds.

The invention contemplates the provision of spring suspension means between the wheel axles and chassis of an automobile or other vehicle which will permit the wheel to yield in the exact direction in which it is urged by the reaction of encountering an obstacle upon the road, the construction being such that, when a small obstacle, the reaction from which approaches the vertical is encountered, the wheel will yield in a nearly vertical direction with reference to the frame of the vehicle, while if the encountered obstacle be larger and the reaction therefore more inclined from the vertical, the wheel will yield in the corresponding direction; a further important feature of this invention being that with this spring suspension a purely vertical force will produce recession of the wheel with respect to the chassis frame.

Figure 1:
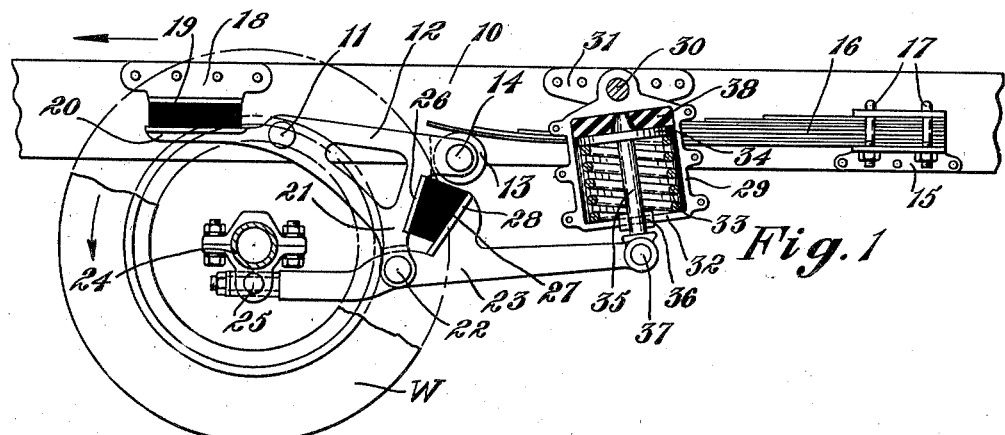
Figure 2:
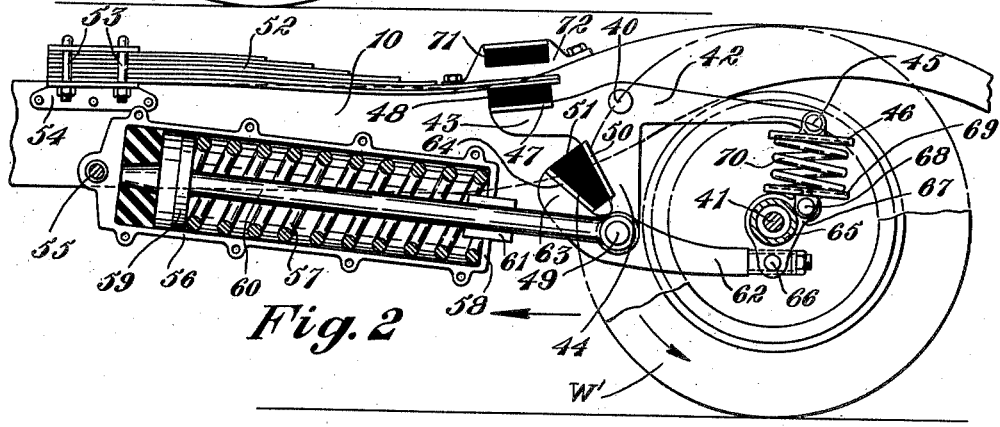
Figure 3:
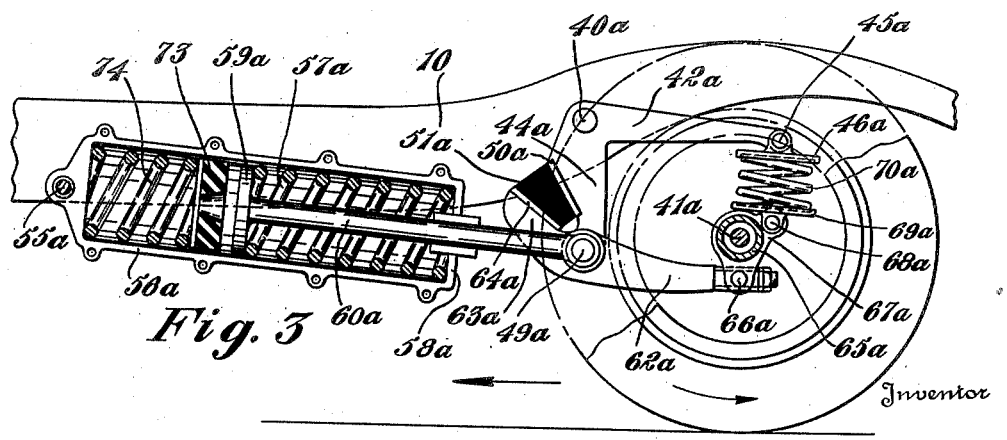

The above objects together with others which will be apparent from the drawing and following description, or which may be later referred to, may be attained by constructing the spring suspension to which the invention pertains in the manner illustrated in the accompanying drawing, in which Figure 1 is a sectional elevation of the improved spring suspension especially designed for a front wheel of a vehicle, the left front wheel and spring suspension therefor being illustrated;

Fig. 2, a similar view showing the improved spring suspension as designed for a rear wheel; and Fig. 3, a modified form of the rear wheel suspension.

Similar numerals refer to similar parts throughout the several views.

Referring first to the construction illustrated in Figure 1, showing a front wheel spring suspension, the chassis frame 10 of the vehicle has a stud 11 rigidly fixed thereon forming a fulcrum upon which the rocking lever arm 12 is pivoted, this arm extending rearwardly from the stud and being provided at its rear end with a flanged roller 13 journaled thereon as at 14. A bracket 15 may be rigidly affixed to the frame 10 at a point beyond the wheel for mounting a laminated spring 16 as by means of U-bolts 17, the forward or free end of the spring bearing against the roller 13, tending to force the rocking arm 12 to rotate clockwise about the stud 11.

A bracket 18 is fixed to the frame 10 at a point forwardly of the stud 11 and provided with a buffer pad 19 which is engaged by the forward extension 20 of the rocking arm 12, forming a stop and limiting the rotational movement of the arm 12 in clockwise direction.

The spring 16 holds the extension 20 of the arm 12 against the buffer pad 19, but any force applied to the arm 12 tending to force it to rotate about the stud 11 in counter-clockwise direction causes the spring 16 to flex so as to permit such movement.

The arm 12 has a downwardly extending portion 21 which carries a pin 22 by means of which the lever 23 is pivotally connected intermediate its ends to the downwardly extending portion 21 of said arm.

This lever normally occupies an approximately horizontal position as indicated in Fig. 1 and its forward end is attached to the front axle 24 as by a universal joint indicated generally at 25.

The detail construction of this joint is not illustrated, but it is pointed out that the rotational movement allowed by this joint as about the vertical axis need be very slight although movement as about the horizontal axes, both longitudinal and transverse of the vehicle, must be free and have a greater range.

A flange 26 is formed upon the downwardly extending portion 21 of the arm 12 and a buffer pad 27 is fixed to said flange, said buffer pad being arranged to be engaged by the upwardly projecting flange 28 upon the lever 23.

A cylindrical spring housing 29 has its upper end journaled as upon the pin 30 carried by the bracket 31 which is fixed to the frame 10. The closed lower end 32 of the spring housing supports and confines the lower end of a helical spring 33, the upper end of which contacts the disk 34 to which is fixed the rod 35 slidably located through a central anti-friction guide 36 in the bottom wall 32 of the spring housing and having its lower end pivotally conected to the rear end of the lever 23 as by the pin 37.

In the topmost possible position of the rod 35, as shown in Fig. 1, the disk 34 engages the buffer pad 38 which is mounted within the upper end of the spring housing.

It will be evident that the parts must be so designed and arranged that the spring housing 29 and the laminated spring 16 will not interfere with each other.

For this purpose the spring 16 may lie close to the frame 10 and the stud 30 must be of sufficient length to suspend the spring housing 29 beyond and clear of the spring 16.

It will be seen that the weight of the car is transmitted from the frame 10 through the stud 11, arm 12, pin 22 and lever 23, the front end of which is supported by the front axle 24.

Considering the train of forces from the axle back to the frame, it will be seen that the front end of the lever 23 is urged upward, but is normally held to the position shown in Fig. 1 by the helical spring 33 acting through the rod 35 on the rear end of the lever 23.

The upward pressure of the pin 22, which pressure is vertical when the car is at rest, exerts a moment about the stud 11 tending to cause the arm 12 to rotate counter-clockwise about said stud, but is held from doing so by the downward pressure of the spring 16 exerted on the arm 12 through the roller 13.

Normally when the car is at rest or rolling on a smooth road the tension of the spring 16 will be just enough to hold the forward projection 20 of the arm 12 against the buffer pad 19, and the tension of the spring 33 will be just enough to hold the disk 34 against the buffer pad 38.

When a vehicle equipped with this spring suspension is in motion, and the wheel W encounters an obstacle, the mechanism permits the wheel to yield in the exact direction in which it is urged by the reaction.

If the obstacle be small the direction of the reaction from it will approach the vertical, in which case the spring 33 will be slightly compressed as the wheel surmounts the obstacle, the moment exerted by the pin 22 about the stud 11 will also slightly flex the spring 16.

It should be noted that the motion of the pin 22 as about the stud 11 has a horizontal component whereby when this motion occurs the pin 22, lever 23, and axle 24 will simultaneously recede with respect to the frame 10, the lever 23 being free to do so because the whole assembly between the pin 37 and stud 30 is free to pivot upon said stud.

This recession not only relieves the impact of the tire against the obstacle, but affords the wheel more time in which to lift for its passage over the obstacle.

A very important feature of this device is that with this mechanism a purely vertical force will produce recession of the wheel with respect to the frame.

However, if the obstacle encountered by the wheel be large the direction of the reaction will be more inclined from the vertical.

By referring to Figure 1 it will be seen that this results in shortening the effective lever arm of the axle 24 as about the pin 22 and lengthening the effective lever arm of the pin 22 as about the stud 11, the natural result of which is that the spring 16 yields more and the spring 33 yields less in proportion and the resultant actual path of the axle 24 is more inclined from the vertical, corresponding or tending to correspond with the direction of the reaction from the obstacle, therefore, containing a larger horizontal component, which increases the relative recession of the axle and wheel allowing the wheel more time in which to surmount the larger article.

The relative position of the stud 11 and pin 6 is important. When the vehicle is in motion, the pin 6 is impelled forward by the inertia of the vehicle. When a retarding force such as the horizontal component of the reaction from an obstacle is impressed on the pin 22 a mechanical couple is formed, the effect of which causes the stud 11 and pin 22 each to tend to revolve about the other as a center, thus, pulling downward on the frame 10 and partially or wholly annulling the effect of the up-thrust exerted by the vertical component of the reaction from the obstacle, and pulling upward on the pin 22 tending to lift the wheel over the obstacle.

In Fig. 2 is shown a preferred construction of the improved spring suspension especially adapted for a rear wheel and designed for use in the same vehicle with the front wheel construction shown in Fig. 1.

A stud 40 is fixed upon the frame 10 at a point forward of the rear axle 41 and pivoted upon said stud is a rocking arm 42 extending rearwardly from the stud and also provided with a forwardly extending portion 43 and a depending portion 44.

A pin 45 is carried by the rearward extension 42 of the arm, and a spring cup 46 is journaled upon said pin. A flange 47 is formed upon the forward extension 43 of the arm and has mounted thereon an elastic pad 48, and the depending extension 44 carries the pin 49 and has the flange 50 formed thereon to which is connected the buffer pad 51.

A laminated spring 52 is connected as by the U-bolts 53 to a bracket 54 fixed upon the frame 10 at a point forward of the stud 40 and the pad 48 upon the forward extension of the arm 42 normally contacts the spring 52 preventing the arm from rotating about the stud 40 in a clockwise direction for more than a few degrees.

A stud 55 is fixed upon the frame 10 preferably below the bracket 54 and the forward end of the spring housing 56 is pivoted upon said stud.

The spring 57 is enclosed within the housing 56 and interposed between the closed end 58 of the housing and the disk 59 which is slidable within the housing and integral with the rod 60 which passes through the guide 61 in the rear end of the housing and is connected at its rear end to the pin 49.

Expansion of the spring 57 acting against the disk 59 will pull forward on the pin 49 tending to rotate the arm 42 clockwise about the stud 40 and pressing the pad 48 against the spring 52. The arm 42 may rotate counter-clockwise about the stud 40 through a considerable angle by compression of the spring 57.

An arm 62 is journaled on the pin 49 and provided with a forward extension 63 which carries a flange 64 adapted to contact the buffer pad 51.

The rear end of the arm 62 is connected to the rear axle housing 65 by means of a universal or flexible coupling or joint as indicated generally at 66.

A bracket 67 is mounted upon the rear axle housing and carries a pin 68 to which is journaled the spring cup 69, a helical compression spring 70 being carried between the cups 46 and 69.

The spring 70 is relatively stiff and carries the full weight of this end or corner of the vehicle. When the wheel W' encounters a small obstacle, the reaction from which is nearly vertical, the spring 70 yields slightly, and in doing so passes the upward thrust of the reaction on to the rearward extension of the arm 42 instead of directly to the frame of the vehicle.

This tends to urge the arm 42 to rotate in a counter-clockwise direction about the stud 40, and if the up-thrust against the rear end of the arm 42 is great enough to produce some rotational motion of said arm, the rear axle is forced to lag or recede relative to the frame.

This effect results from the vertical component only of any reaction received from an obstacle and is independent of the horizontal component of any such reaction. However, when the wheel encounters a larger obstacle, the reaction from which has an appreciable horizontal component, this component obviously acts through the arm 62 to exert a rearward pull upon the pin 49, compressing the spring 57 and producing a counter-clockwise movement of the arm 42.

When the vehicle starts from a standing position the forward thrust of the rear wheels as the power is turned on will act through the rear axle and arm 62 to push forward on the pin 49 tending to cause the arm 42 to rotate clockwise about the stud 40, crowding the pad 48 against the free end of the spring 52 which may yield until it engages the pad 71 upon the bracket 72 which is fixed upon the frame 10 at a point above the free end of the spring 52.

This yielding permits the rear axle to move forward slightly relative to the frame 10, the rear wheels, of course, also moving forward at the same time tending to reduce slipping of the tires in starting.

Engagement of the pad 51 by the flange 64 serves to prevent the rear axle from throwing its full weight on the spring 70 when the body of the vehicle is jacked up or when the vehicle rebounds or bounces upon striking an obstacle or depression in the road.

In Fig. 3, is shown a slightly modified form of rear wheel construction in which the rocker arm 42a is pivoted upon the stud 40a fixed upon the frame 10 at a point in advance of the rear axle 41a.

The rear end of the arm 42a being pivotally connected as by a pin 45a to a spring cup 46a, a coil spring 70a being interposed between said cup and the spring cup 69a pivotally connected by a pin 68a to a bracket 67a upon the rear axle housing 65a.

The depending arm 44a upon the rocking arm 42a is pivotally connected as by the pin 49a to the member 62a, the rear end of which is connected to the rear axle housing as by the universal joint 66a.

A flange 50a is formed upon the depending portion 44a of the rocking arm and has a buffer pad 51a fixed thereto for contact with the flange 64a upon the projection 63a of the member 62a.

A spring housing 56a is pivotally connected to the frame as by the stud 55a and has located therein the spring 57a interposed between the rear wall 58a of the spring housing and the disk 59a to which is fixed the rod 60a, the other end of which is pivotally connected to the pin 49a.

A buffer pad 73 may be normally urged toward the disk 59a as by the spring 74.

When the wheel encounters an obstacle, the action will be substantially the same as with the construction shown in Fig. 2.

According to the provisions of the patent statutes I have explained the principle of my invention and described embodiments thereof, but I desire to have it understood that within the scope of the appended claims the invention may be practiced otherwise than as specifically illustrated and described, the disclosure herein illustrative but not restrictive.

I claim:

1. In combination with a vehicle frame, an axle, a wheel carried by the axle, a spring suspension including a rocking arm pivoted upon the frame at a point spaced from the axle and having its free end directed toward the axle, a depending portion upon the rocking arm, a member pivotally connected to the axle and pivotally connected to the depending portion of the rocking arm, spring means for urging the end of the rocking arm toward the axle upward, a spring housing pivotally mounted upon the frame, a disk slidable within the housing, a rod connected to the disk and pivotally connected to said member, and a spring in the housing between the disk and the swinging end of the housing.

2. In combination with a vehicle frame, an axle, a wheel carried by the axle, a spring suspension including a rocking arm pivoted upon the frame at a point spaced from the axle and having its free end directed toward the axle, a depending portion upon the rocking arm, a member pivotally connected to the axle and pivotally connected to the depending portion of the rocking arm, an upwardly projecting flange upon said member, a buffer pad between said flange and said depending portion of the rocking arm, spring means for urging the end of the rocking arm toward the axle upward, a spring housing pivotally mounted upon the frame, a disk slidable within the housing, a rod connected to the disk and pivotally connected to said member, and a spring in the housing between the disk and the swinging end of the housing.

3. In combination with a vehicle frame, an axle, a wheel carried by the axle, a spring suspension including a rocking arm pivoted upon the frame at a point spaced from the axle and having its free end directed toward the axle, a depending portion upon the rocking arm, a member pivotally connected by a universal joint to the axle and pivotally connected to the depending portion of the rocking arm, spring means for urging the end of the rocking arm toward the axle upward, a spring housing pivotally mounted upon the frame, a disk slidable within the housing, a rod connected to the disk and pivotally connected to said member, and a spring in the housing between the disk and the swinging end of the housing.

4. In combination with a vehicle frame, an axle, a wheel carried by the axle, a spring suspension including a rocking arm pivoted upon the frame at a point spaced from the axle and having its free end directed toward the axle, a depending portion upon the rocking arm, a member pivotally connected by a universal joint to the axle and pivotally connected to the depending portion of the rocking arm, an upwardly projecting flange upon said member, a buffer pad between said flange and said depending portion of the rocking arm, spring means for urging the end of the rocking arm toward the axle upward, a spring housing pivotally mounted upon the frame, a disk slidable within the housing, a rod connected to the disk and pivotally connected to said member, and a spring in the housing between the disk and the swinging end of the housing.

5. In combination with a vehicle frame, an axle, a wheel carried by the axle, a spring suspension including a rocking arm pivoted upon the frame and having one end extending rearwardly from the pivot point, a roller upon the rear end of said rocking arm, a spring upon the frame bearing against the top of the roller, a depending portion upon the rocking arm, a member pivotally connected to the axle and pivotally connected to the depending portion of the rocking arm, a spring housing pivotally mounted upon the frame, a disk slidable within the housing, a rod connected to the disk and pivotally connected to said member, and a spring in the housing between the disk and the swinging end of the housing.

6. In combination with a vehicle frame, an axle, a wheel carried by the axle, a spring suspension including a rocking arm pivoted upon the frame and having one end extending rearwardly from the pivot point, a spring interposed between the rear end of said rocking arm and the axle, a depending portion upon the rocking arm, a member pivotally connected to the axle and pivotally connected to said depending portion of the rocking arm, a spring housing pivotally mounted upon the frame, a disk slidable within the housing, a rod connected to the disk and pivotally connected to said member, and a spring in the housing between the disk and the swinging end of the housing.

7. In combination with a vehicle frame, an axle, a wheel carried by the axle, a spring suspension including a rocking arm pivoted upon the frame and having one end extending rearwardly from the pivot point, a roller upon the rear end of said rocking arm, a spring upon the frame bearing against the top of the roller, a forward extension upon said rocking arm, a buffer pad between the upper side of said extension and the frame, a depending portion upon the rocking arm, a member pivotally connected to the axle and pivotally connected to the depending portion of the rocking arm, a spring housing pivotally mounted upon the frame, a disk slidable within the housing, a rod connected to the disk and pivotally connected to said member, and a spring in the housing between the disk and the swinging end of the housing.

8. In combination with a vehicle frame, an axle, a wheel carried by the axle, a spring suspension including a rocking arm pivoted upon the frame and having one end extending rearwardly from the pivot point, a spring interposed between the rear end of said rocking arm and the axle, a forward extension upon the rocking arm, a buffer pad between the upper side of said extension and the frame, a depending portion upon the rocking arm, a member pivotally connected to the axle and pivotally connected to said depending portion of the rocking arm, a spring housing pivotally mounted upon the frame, a disk slidable within the housing, a rod connected to the disk and pivotally connected to said member, and a spring in the housing between the disk and the swinging end of the housing.

WALTER W. WOOD.